US 10,815,703 B2

(12) United States Patent
Ciarmatori et al.

(10) Patent No.: US 10,815,703 B2
(45) Date of Patent: Oct. 27, 2020

(54) CLOSING DEVICE OF A FUEL TANK LID FOR VEHICLES

(71) Applicant: CEBI ITALY S.P.A., Dronero (CN) (IT)

(72) Inventors: Marco Ciarmatori, Camerano (IT); Edoardo Baleani, Agugliano (IT); Riccardo Grossi, Osimo (IT)

(73) Assignee: CEBI ITALY S.P.A., Dronero (CN) (IT)

( * ) Notice: Subject to any disclaimer, the term of this patent is extended or adjusted under 35 U.S.C. 154(b) by 445 days.

(21) Appl. No.: 15/837,631

(22) Filed: Dec. 11, 2017

(65) Prior Publication Data
US 2018/0179789 A1 Jun. 28, 2018

(30) Foreign Application Priority Data

Dec. 27, 2016 (IT) .................. 102016000131138

(51) Int. Cl.
*E05B 83/28* (2014.01)
*E05B 83/34* (2014.01)
(Continued)

(52) U.S. Cl.
CPC .............. *E05B 83/34* (2013.01); *B60K 15/05* (2013.01); *E05B 81/16* (2013.01); *E05B 81/66* (2013.01); *B60K 2015/03447* (2013.01); *B60K 2015/053* (2013.01); *B60K 2015/0515* (2013.01); *B60K 2015/0546* (2013.01);
(Continued)

(58) Field of Classification Search
CPC .............. E05B 83/34; Y10T 292/0863; Y10T 292/0864; Y10T 292/0867; Y10T 292/0868; Y10T 292/0886; Y10T 292/0887; Y10T 292/1021; Y10T 292/1031; Y10T 292/0969; Y10T 292/0977; Y10T 292/0997;
(Continued)

(56) References Cited

U.S. PATENT DOCUMENTS

| 334,887 A * | 1/1886 | Neisler ................... E05B 83/02 292/187 |
| 1,133,962 A * | 3/1915 | Hoglund ................. E05B 85/22 292/164 |

(Continued)

FOREIGN PATENT DOCUMENTS

| DE | 102011116067 A1 | 1/2013 | |
| DE | 102012011440 A1 * | 12/2013 | ............. E05B 83/34 |
| EP | 1295748 A2 | 4/2016 | |

*Primary Examiner* — Carlos Lugo
(74) *Attorney, Agent, or Firm* — Egbert, McDaniel & Swartz, PLLC

(57) ABSTRACT

A closing device includes a box with a hole, a roto-translating pin disposed in the hole of the box in such a way to rotate and translate from a retracted closing position to an extracted opening position. The closing device has a spring to push the roto-translating pin in the opening position, a locking device to lock the roto-translating pin in the closing position, a first actuator to move the locking device, a second actuator to move the first actuator. The roto-translating pin has a shoulder that protrudes externally from the roto-translating pin to be stopped against the internal wall of the box around the hole in such manner to stop the extraction travel of the roto-translating pin.

7 Claims, 4 Drawing Sheets

(51) Int. Cl.
*B60K 15/05* (2006.01)
*E05B 81/66* (2014.01)
*E05B 81/16* (2014.01)
*E05B 85/00* (2014.01)
*E05B 81/06* (2014.01)
*E05B 81/64* (2014.01)
*E05C 19/02* (2006.01)
*B60K 15/03* (2006.01)

(52) U.S. Cl.
CPC ............. *B60K 2015/0569* (2013.01); *B60K 2015/0576* (2013.01); *B60K 2015/0584* (2013.01); *E05B 81/06* (2013.01); *E05B 81/64* (2013.01); *E05C 19/022* (2013.01); *Y10T 292/0864* (2015.04)

(58) Field of Classification Search
CPC .... B60K 2015/0515; B60K 2015/0569; B60K 2015/0576; B60K 2015/0584
See application file for complete search history.

(56) References Cited

U.S. PATENT DOCUMENTS

| | | | | |
|---|---|---|---|---|
| 1,209,924 A * | 12/1916 | Ackley | .......... | E05C 1/14 292/170 |
| 1,377,061 A * | 5/1921 | Deeg | .......... | E05B 47/0002 70/279.1 |
| 1,907,625 A * | 5/1933 | Vogt | .......... | E05B 65/0864 70/100 |
| 2,991,106 A * | 7/1961 | Claud-Mantle | .......... | B65D 45/22 292/65 |
| 3,157,042 A * | 11/1964 | Wolz | .......... | E05B 47/0012 70/279.1 |
| 3,285,616 A * | 11/1966 | Doutt | .......... | F15B 15/223 277/572 |
| 4,167,104 A * | 9/1979 | Bond | .......... | E05B 5/003 70/208 |
| 4,258,946 A * | 3/1981 | Angioletti | .......... | E05B 51/02 292/144 |
| 4,854,619 A * | 8/1989 | Nakauchi | .......... | E05B 47/0002 292/335 |
| 4,865,367 A * | 9/1989 | Choi | .......... | E05B 65/104 292/92 |
| 5,222,774 A * | 6/1993 | Fukumoto | .......... | E05B 81/14 292/144 |
| 5,666,830 A * | 9/1997 | Litvin | .......... | E05B 9/00 292/165 |
| 5,813,257 A * | 9/1998 | Claghorn | .......... | E05B 5/003 292/201 |
| 5,862,693 A * | 1/1999 | Myers | .......... | E05B 47/0002 292/144 |
| 6,079,755 A * | 6/2000 | Chang | .......... | E05B 47/0002 292/144 |
| 6,474,119 B1 * | 11/2002 | Halvorson | .......... | E05B 85/107 292/336.3 |
| 6,601,418 B2 * | 8/2003 | Huang | .......... | E05B 47/0002 292/137 |
| 7,155,946 B2 * | 1/2007 | Lee | .......... | E05B 59/00 292/169.14 |
| 8,398,127 B2 * | 3/2013 | Persiani | .......... | E05C 19/022 292/163 |
| 9,151,367 B2 * | 10/2015 | Frommann | .......... | F16H 21/44 |
| 9,493,967 B2 * | 11/2016 | Basavarajappa | .......... | E05C 19/022 |
| 9,828,793 B2 * | 11/2017 | Shah | .......... | E05B 17/0045 |
| 9,950,615 B2 * | 4/2018 | Horikawa | .......... | B60K 15/05 |
| 10,006,230 B2 * | 6/2018 | Nam | .......... | E05B 83/34 |
| 2006/0226660 A1* | 10/2006 | Wu | .......... | E05B 41/00 292/145 |
| 2015/0167225 A1* | 6/2015 | Park | .......... | D06F 37/28 292/144 |
| 2016/0108648 A1 | 4/2016 | Nam | | |
| 2016/0375761 A1* | 12/2016 | Horikawa | .......... | B60K 15/05 49/276 |

* cited by examiner

CLOSING DEVICE OF A FUEL TANK LID FOR VEHICLES

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present patent application for industrial invention relates to a closing device of a fuel tank lid for vehicles.

2. Description of Related Art Including Information Disclosed Under 37 CFR 1.97 and 37 CFR 1.98

Closing devices of a fuel tank lid for vehicles are known, which comprise a box and a roto-translating pin provided with a head suitable for engaging a slot of the fuel tank lid. In particular, the box comprises a hole to permit the insertion of the roto-translating pin in such a way that the head of the roto-translating pin externally protrudes from the box.

The roto-translating pin is mounted in the box in such a way to rotate and translate from a retracted closing position, wherein the head engages said slot of the lid, to an extracted opening position, wherein the head disengages the slot of the lid. The roto-translating pin has a constant diameter and comprises a stop seat provided with a stop edge.

Moreover, the closing device comprises spring means to push the roto-translating pin into the extracted opening position, a locking device to lock the roto-translating pin in closing position, an actuator and actuation means that actuate the locking device and a locking wing that locks the roto-translating pin, preventing it from protruding from the box.

Said closing device is impaired by a first drawback due to the fact that, being a mobile part, the locking wing used to stop the extraction travel of the roto-translating pin is very delicate and breaks easily. Moreover, the operation of said wings may be impaired by any limit condition, such as the non-compliance of tolerance values or the presence of extreme operating temperatures.

The closing device is also impaired by a second drawback due to the fact that water may leak inside the box. In fact, water can enter the box through the hole that permits the head of the roto-translating pin to protrude from the box. Water infiltrations may damage or irremediably break the closing device.

US2016108648 discloses a push lock with actuator embedded in the lock, for opening and closing a fuel tank lid for vehicles.

The purpose of the present invention is to overcome the drawbacks of the prior art by disclosing a closing device that is reliable, efficient and resistant.

Another purpose is to disclose a watertight closing device in such a way to prevent any water leakage inside the box.

BRIEF SUMMARY OF THE INVENTION

A closing device according to the invention comprises a box with a hole and a roto-translating pin with a head suitable for engaging a slot of the fuel tank lid. The roto-translating pin is disposed in the hole of the box in such a way to rotate and translate from a retracted closing position, wherein the head engages said slot of the lid, to an extracted opening position, wherein the head disengages the slot of the lid. The roto-translating pin comprises a stop seat provided with a stop edge.

The closing device comprises spring means to push the roto-translating pin in the extracted opening position.

The closing device comprises a locking device that cooperates with the roto-translating pin in order to go from a locking position, wherein the roto-translating pin is locked in the retracted closing position, to an unlocking position, wherein the roto-translating pin is unlocked. The locking device comprises a lever that is hinged to the box by means of a first pin. The lever has an arm provided with a locking tooth suitable for being stopped against the stop edge of the stop seat of the roto-translating pin.

The closing device comprises actuation means connected to the locking device in order to move the locking device in the locking position and in the unlocking position. The actuation means comprise a connection lever that is hinged to the box by means of a second pin and is provided with a first arm connected to the locking device and a second arm.

The locking device comprises an actuator suitable for actuating the actuation means. The actuator is connected to the second arm of the connection lever of the actuation means. The peculiarity of the closing device according to the invention consists in the fact that the roto-translating pin comprises a shoulder that externally protrudes from the roto-translating pin in order to be stopped against the internal wall of the box around the hole in such a way to stop the extraction travel of the roto-translating pin.

BRIEF DESCRIPTION OF THE SEVERAL VIEWS OF THE DRAWINGS

For the sake of clarity the description of the closing device according to the invention continues with reference to the attached drawings, which have a merely illustrative, not limiting value, wherein.

DETAILED DESCRIPTION OF THE INVENTION

Figure 1:
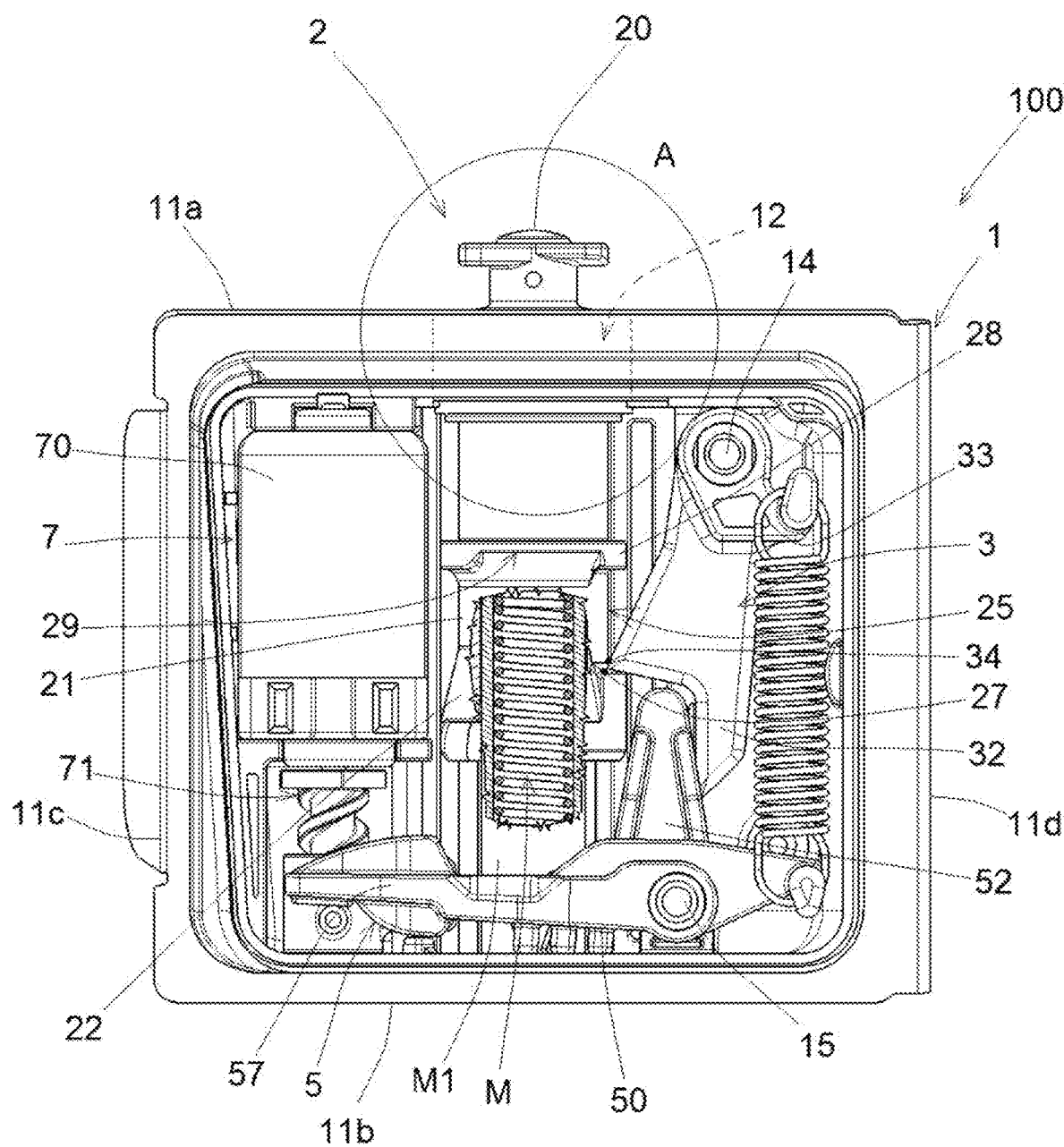
FIG. 1 is a top view of the closing device according to the invention, wherein an upper wall of a box is omitted in order to show the interior of the box.
Figure 2:
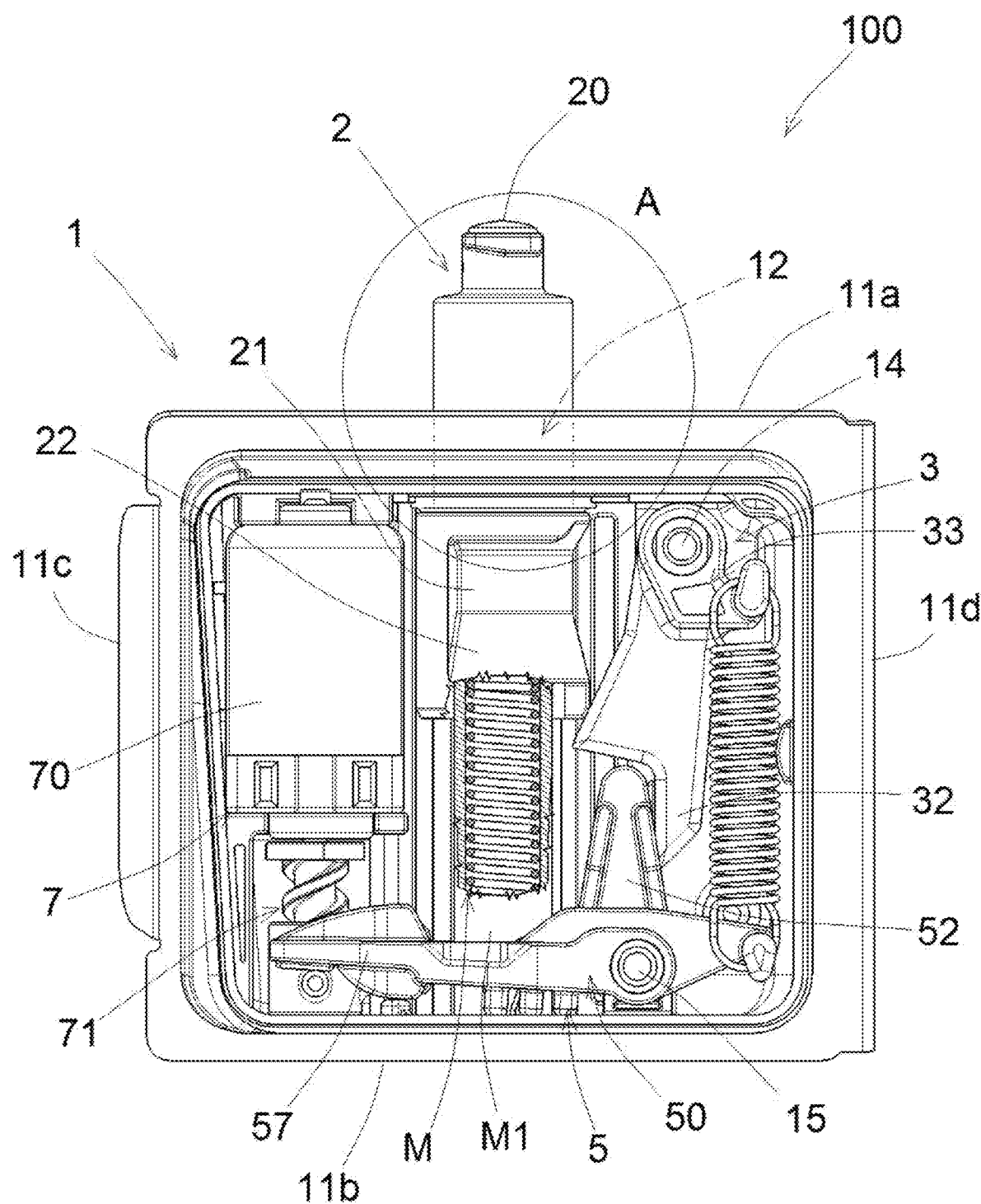
FIG. 2 is the same as FIG. 1, wherein a roto-translating pin is in opening position.

With reference to FIGS. 1 and 2, a closing device according to the invention is disclosed, being generally indicated with reference numeral (100).

The closing device (100) comprises a box (1) suitable for being recessed in the body of the vehicle behind a lid (not shown) of the vehicle fuel tank. The box (1) has a substantially parallelepiped shape and comprises a bottom wall (10) and four walls (11a, 11b, 11c, 11d) rising from the bottom wall. The walls comprise a front wall (11a), a rear wall (11b) and two lateral walls (11c, 11d). The front wall (11a) comprises a hole (12).

The closing device (100) comprises a roto-translating pin (2) disposed in the hole (12) of the box and provided with a head (20) with a "T-shaped" axial section suitable for engaging a slot (not shown) of the lid of the vehicle fuel tank. The roto-translating pin (2) has a cylindrical body (21) and a back end (22) opposite to the head (20). With reference to FIG. 1, a stop seat (25) is obtained on the lateral surface of the cylindrical body in proximity of the back end (22). The stop seat (25) has a stop edge (27) disposed on the back part of the roto-translating pin (2).

Figure 2A:
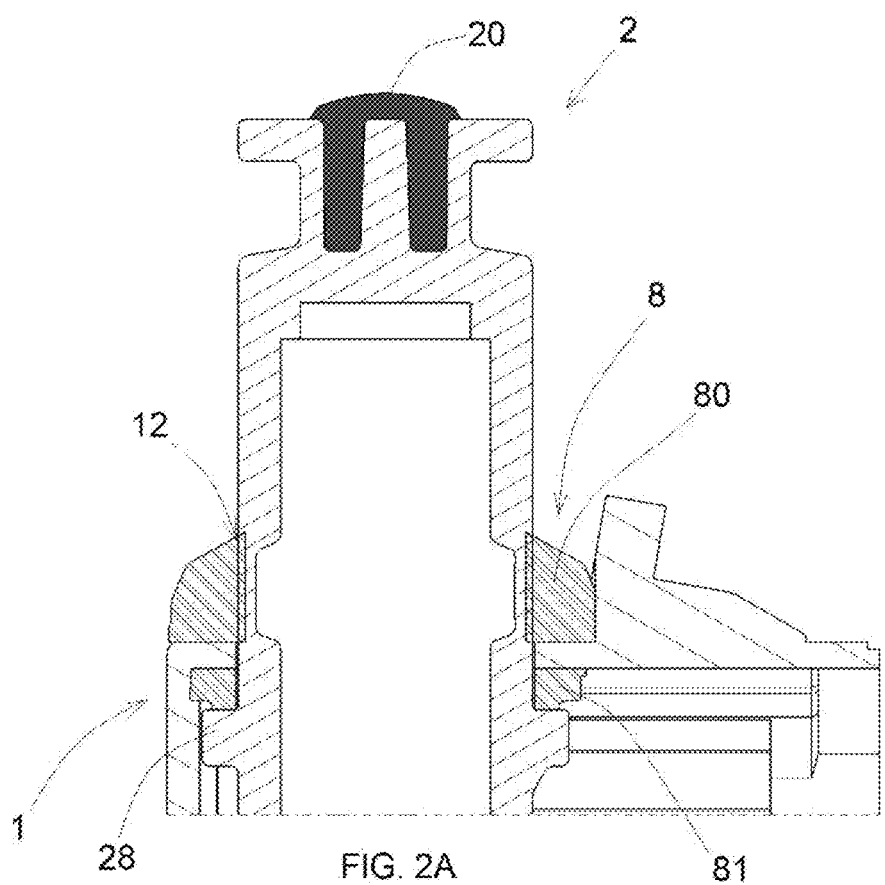
FIG. 2A is a sectional view of the detail enclosed in the circle A of FIG. 2, seen from another direction.

With reference to FIGS. 1 and 2A, the roto-translating pin (2) comprises a shoulder (28) disposed at half height of the roto-translating pin (2). The stop seat (25) is defined between the shoulder (28) and the stop edge (27).

The shoulder (28) protrudes radially from the roto-translating pin in order to be stopped against the internal wall of the box (1) around the hole (12), in such a way to stop the extraction travel of the roto-translating pin (2). The shoulder (28) is composed of a collar that perimetrally surrounds the roto-translating pin.

Alternatively, the shoulder (28) can be a stop tooth that protrudes from the cylindrical body (21).

Because of the provision of said shoulder (28), when the closing device (100) is mounted, the roto-translating pin (2) must be inserted in the hole (12) from the interior of the box (1) towards the exterior of the box (1).

Figure 1A:
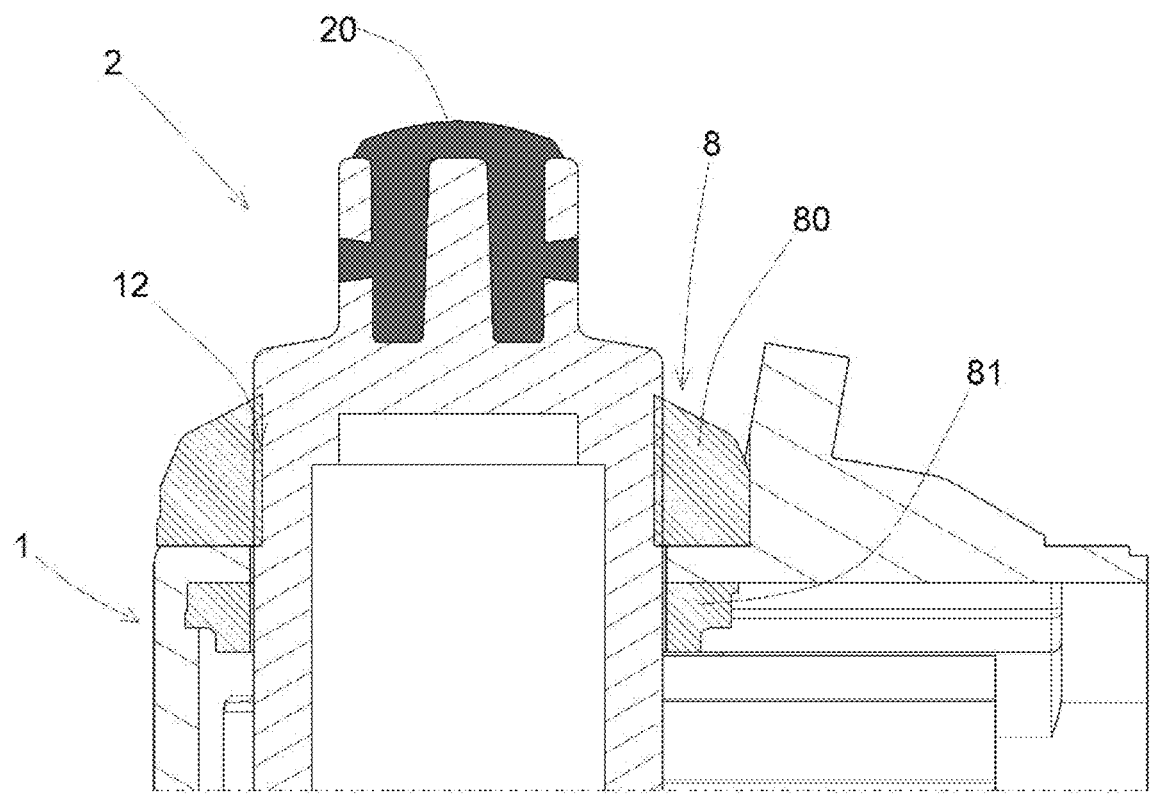
FIG. 1A is a sectional view of the detail enclosed in the circle A of FIG. 1, seen from another direction.

With reference to FIGS. 1A and 2A, the closing device (100) comprises a seal gasket (8) disposed around the hole (12) of the box. The shoulder (28) of the roto-translating pin (2) is suitable for pressing against the seal gasket (8) in such a way to prevent water from entering the box (1).

In particular, the seal gasket (8) comprises a first ring (80) disposed outside the box (1) and a second ring (81) disposed inside the box (1); the shoulder (28) of the roto-translating pin (2) is suitable for pressing against the second ring (81) of the seal gasket (8).

Spring means (M) are connected to the back part of the rototranslating pin (2). The spring means (M) push the roto-translating pin (2) in extracted opening position. Said spring means (M) comprise a spring inserted in a tube (M1) fixed to the box (1). The roto-translating pin (2) is slidingly mounted on the tube (M1). The spring means (M) operate under compression, being compressed between the roto-translating pin (2) and a back wall of the tube (M1).

The cylindrical body (21) of the roto-translating pin is internally empty and a groove (not shown in the figures) shaped like a portion of thread or helix is obtained on the internal surface of the cylindrical body (21) of the roto-translating pin. A tappet (not shown in the figures) is mounted on the external surface of the tube (M1) that is inserted in the cylindrical body (21) of the roto-translating pin. The tappet of the tube (M1) is engaged in the groove of the roto-translating pin (2). In view of the above, the groove of the roto-translating pin (2) acts as cam, permitting a roto-translation of the roto-translating pin (2). Therefore, the rototranslating pin (2) can rotate and translate from a retracted closing position (FIGS. 1 and 1A), wherein the head (20) engages the slot of the lid, to an extracted opening position (FIGS. 2 and 2A), wherein the head (20) disengages the slot of the lid and partially opens the lid.

The closing device (100) comprises a locking device (3) that cooperates with the roto-translating pin (2) in order to go from a locking position, wherein the locking device (3) locks the roto-translating pin (2) in the retracted closing position, to an unlocking position, wherein the locking device (3) unlocks the roto-translating pin.

The locking device (3) comprises a lever that is hinged to the box (1) by means of a first pin (14). The lever has a first arm (32) and a second arm (33) that are angularly spaced by an acute angle of approximately 70-80°.

The first arm (32) is longer than the second arm (33). The second arm (33) faces the lateral wall (11d) of the box. The first arm (32) is substantially parallel to the lateral wall (11d) of the box. The first arm (32) comprises a locking tooth (34) suitable for being stopped against the stop edge (27) of the stop seat (25) of the rototranslating pin (FIG. 1) when the roto-translating pin is in extracted closing position. In view of the above, the first arm (32) of the locking device acts as strut to lock the roto-translating pin (2). The higher the tractive force exerted on the roto-translating pin is, the higher the locking force provided by the locking device (3) will be.

The closing device (100) comprises actuation means (5) connected to the locking device (3) in order to move the locking device in the locking position and in the unlocking position. The actuation means (5) comprise a connection lever (50) that is hinged to the box (1) by means of a second pin (15).

The connection lever (50) comprises a first arm (52) connected to the locking device (3) and a second arm (57) orthogonal to the first arm.

The closing device (100) comprises an actuator (7) suitable for actuating the actuation means (5). The actuator (7) is connected to the second arm (57) of the connection lever of the actuation means (5), in such a way that the actuator (7) moves the second arm (57) of the connection lever (50). The actuator (7) comprises an electric motor (70) provided with a driving shaft (71). The actuator (7) is disposed in the proximity of the lateral wall (11c) of the box.

The electrical motor (70) can be electrically connected to a button disposed in the interior of the vehicle or to the control unit of the vehicle. Moreover, the electrical motor (70) can be actuated by means of a key or a remote control.

Figure 3:
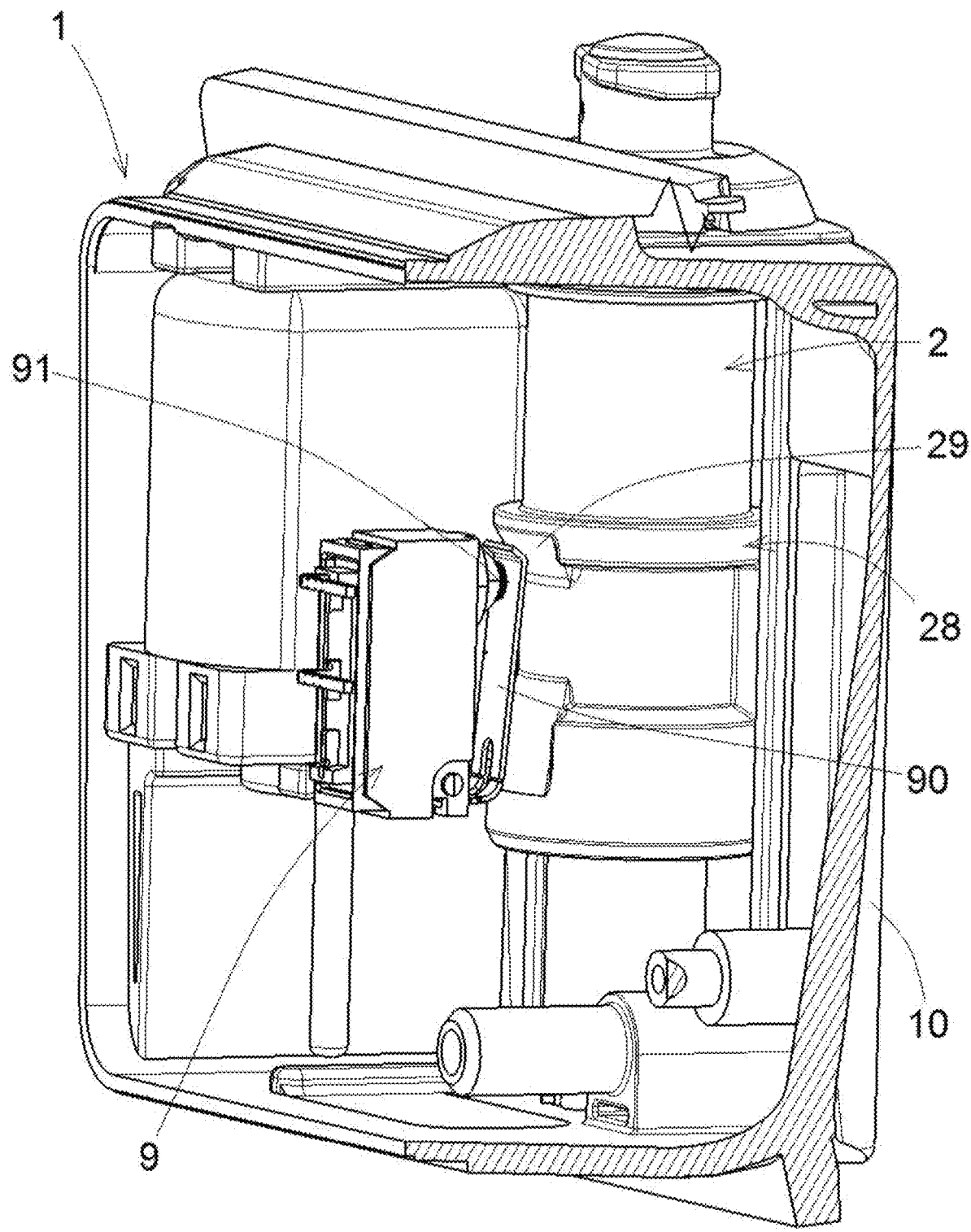
FIG. 3 is an axonometric view of a portion of the closing device of FIG. 1.

With reference to FIG. 3, the closing device (100) optionally comprises a motion sensor (9), such as a microswitch, disposed in the box (1) and suitable for detecting the movement of the roto-translating pin (2). The motion sensor (9) detects the movement of the roto-translating pin (2) from its retracted closing position. Advantageously, the motion sensor (9) can be connected to the electronic control unit of the vehicle in order to provide information on the movement of the roto-translating pin (2).

The collar of the shoulder (28) comprises a notch (29), as shown in FIGS. 1 and 3. The notch (29) comprises an inclined wall suitable for cooperating with a blade (90) of the motion sensor in order to move said blade (90) closer to an electrical contact (91), in such a way to send an electrical signal to the electronic control unit of the vehicle when the roto-translating pin (2) passes near the motion sensor (9).

This description continues by illustrating the operation of the closing device (100).

With reference to FIG. 1, in an initial situation, the closing device (100) is in closed position. The roto-translating pin (2) is in a retracted closing position and the head (20) of the roto-translating pin engages the slot of the fuel tank lid. The locking tooth (34) of the locking device (3) is stopped against the stop edge (27) of the stop seat (25) of the roto-translating pin (2), preventing a traction of the roto-translating pin (2) caused by an attempt to open the lid.

When the electrical motor (70) is actuated, said actuator (7) pushes the second arm (57) of the connection lever. The connection lever (50) rotates around the second pin (15) of the box. Accordingly, the first arm (52) of the connection lever pushes the locking device (3), making the locking device rotate around the first pin (14) of the box. So the locking device (3) is disengaged from the stop edge (27) of the stop seat (25) of the roto-translating pin (2), releasing the roto-translating pin (2).

With reference to FIG. 2, the spring of the spring means (M) is compressed and pushes outwardly the roto-translating pin (2) that makes a translation and a rotation. The head (20) of the roto-translating pin disengages the slot of the fuel tank lid, permitting to open the lid.

The extraction travel of the roto-translating pin (2) is stopped when the shoulder (28) of the roto-translating pin (2) is stopped against the internal ring (81) of the seal gasket (8) (FIG. 2A). In view of the above, liquid tightness is guaranteed.

It must be noted that liquid tightness is especially guaranteed when the roto-translating pin (2) is in opening position. In fact, liquids can enter in the box (1) and damage the actuator only when the lid is open.

When the fuel tank lid is closed by the user, the roto-translating pin (2) is pushed inwards, compressing the spring means (M), until the locking tooth (34) of the locking device enters the stop seat (25) of the roto-translating pin and stops against the stop edge (27) of the stop seat of the 10 roto-translating pin (FIG. 1).

We claim:

1. An apparatus for closing a fuel tank lid of a vehicle, the fuel tank lid having a slot therein, the apparatus comprising:
   a box having a hole formed therein;
   a roto-translating pin having a head adapted to engage the slot of the fuel tank lid, said roto-translating pin being disposed in the hole of said box so as to rotate and translate from a retracted closing position to an extracted opening position, the head engaging the slot of the fuel tank lid in the retracted closing position, the head disengaged from the slot of the fuel tank lid in the extracted opening position, said roto-translating pin having a stop seat with a stop edge, said roto-translating pin having a shoulder that protrudes radially from said roto-translating pin so as to stop against an internal wall of said box around the hole so as to stop an extraction travel of said roto-translating pin;
   a spring cooperative with said roto-translating pin so urge said roto-translating pin to the extracted opening position;
   a lock cooperative with said roto-translating pin so as to move to a locking position to lock said roto-translating pin in the retracted closing position and to move to an unlocking position to unlock and release said roto-translating pin, said lock comprising a lever hinged to said box by a first pin, the lever having an arm with a locking tooth adapted to stop against the stop edge of the stop seat of said roto-translating pin;
   an actuation means cooperative with said lock between the locking position and the unlocking position, said actuation means comprising a connection lever hinged to said box by a second pin and a first arm connected to said lock and a second arm;
   an actuator cooperative with said actuation means, said actuator being connected to said second arm of the connection lever; and
   a first seal gasket displaced around the hole of said box, said shoulder of said roto-translating pin adapted to press against said first seal gasket.

2. The apparatus of claim 1, wherein the shoulder has a collar that surrounds said roto-translating pin.

3. The apparatus of claim 1, further comprising:
   a second seal gasket has a first ring disposed exterior of said box and a second ring disposed interior of said box, the shoulder of said roto-translating pin adapted to bear against the second ring of said second seal gasket.

4. The apparatus of claim 1, wherein the shoulder is disposed at a height that is half of a height of said roto-translating pin.

5. The apparatus of claim 1, wherein the stop seat is defined between the shoulder and the stop edge in a back part of said roto-translating pin.

6. The apparatus of claim 1, further comprising:
   a motion sensor disposed in said box, said motion sensor adapted to detect a movement of said roto-translating pin.

7. The apparatus of claim 6, wherein the shoulder of said roto-translating pin comprises a notch having an inclined wall on the shoulder cooperating with a blade of said motion sensor.

* * * * *